March 16, 1948. B. L. MALLORY 2,437,749
SHOCK ABSORBER
Filed Sept. 28, 1945

INVENTOR.
Bonnie L. Mallory
BY
Hull & West
ATTYS.

Patented Mar. 16, 1948

2,437,749

UNITED STATES PATENT OFFICE 2,437,749

SHOCK ABSORBER

Bonnie L. Mallory, Cleveland Heights, Ohio, assignor to The B. L. Mallory Company, Hazel Park, Mich., a corporation of Michigan Application September 28, 1945, Serial No. 619,179

15 Claims. (Cl. 188—130)

This invention relates to improvements in shock absorbers, and its objects are to provide a device of this class that is highly efficient; that is very simple of construction, being comprised of a minimum number of parts; that is relatively inexpensive of manufacture; that is devoid of adjustments and requires no attention over long periods of time; that is especially convenient of assembly and installation, and that may be readily disassembled in whole or in part for purposes of inspection and replacement of any parts that may in time become worn enough to impair their effectiveness.

My improved shock absorber includes an energizing band of resilient metal, the stiffness of which determines the power of the shock absorber, and it is a further purpose of my invention to provide a construction which affords ready accessibility of the energizing band and that facilitates the substitution of one band for another, or the addition to the band of a so-called booster clip, in case it is desired to increase or otherwise change the power of the shock absorber.

Figure 1:
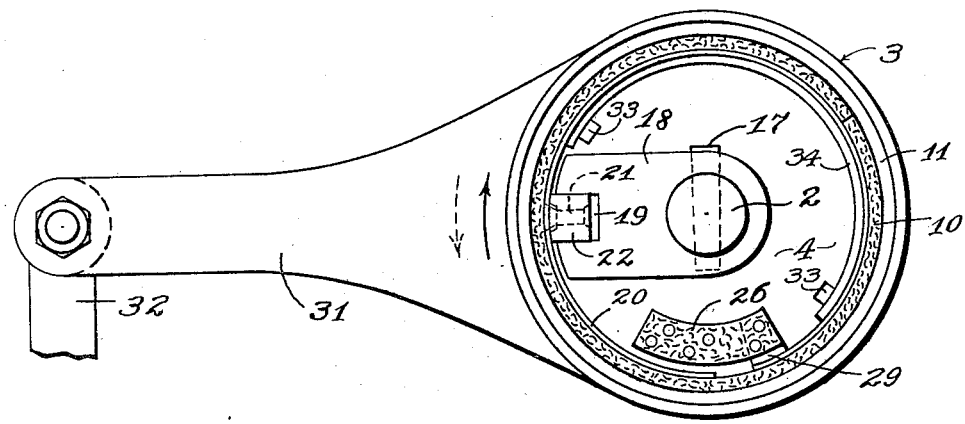
Figure 2:
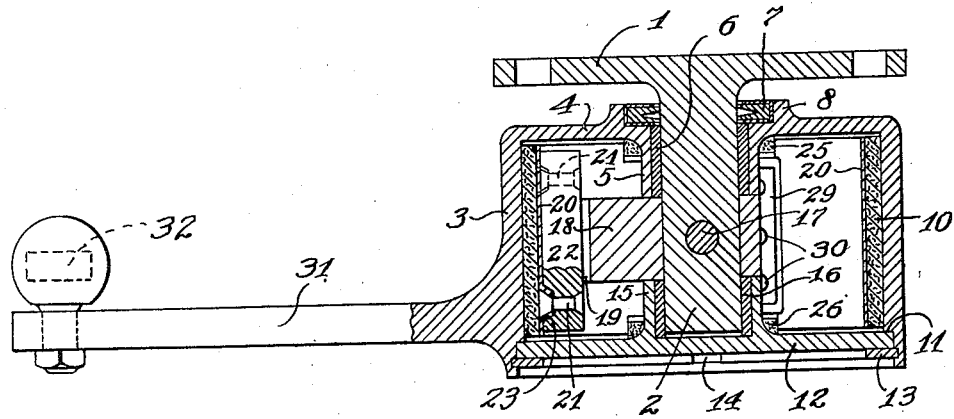
Figure 4:
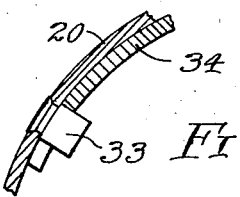
Figure 3:
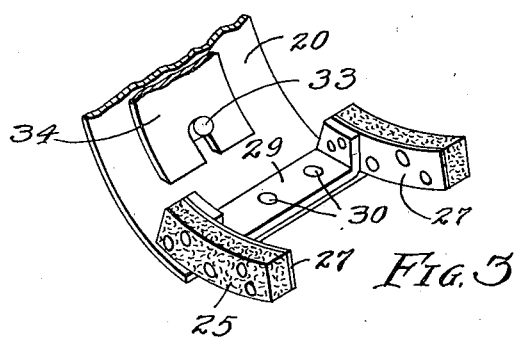

The foregoing objects and advantages, with others hereinafter appearing, are attained in the construction illustrated in the accompanying drawing wherein Fig. 1 is a front elevational view of my improved shock absorber with the cover and its retaining ring removed; Fig. 2 is a sectional plan; Fig. 3 is a detail in perspective of the end of the energizing band equipped with drag shoes and booster clip, and Fig. 4 is a sectional detail of the connection between the energizing band and the booster clip.

Like reference characters designate corresponding parts in the several views of the drawing.

1 designates a base or mounting that is adapted to be secured in the usual way to a part of the vehicle, and 2 is a stud that is rigid with said base or mounting, the two being shown in the drawing as integral parts of a unit that is preferably cast of suitable metal.

Mounted for oscillation on the stud 2 is a casing 3 having an end wall 4 that is provided with a central hub 5 that is journaled, through a bearing 6, on the stud 2. A dust ring 7 is set into a recessed boss 8 on the exterior of the wall 4 to protect the bearing 6. The peripheral wall of the casing is cylindrical and to its inner surface, which is concentric to the stud 2, is applied a lining 10 of friction material. The open front of the casing is countersunk to provide a shoulder 11, and to receive a cover 12 whose edge portion seats against said shoulder, and the cover is held in place by an expanding ring 13 that is engaged within a circumferential groove 14 of the casing. The cover 12 is provided with a central hub 15 that is journaled, through a bushing 16, on the outer end of the stud 2.

Fastened, as by means of a pin 17, to the stud 2, between the hubs 5 and 15, is a segment 18 that has a groove 19 in its outer end that is parallel to the stud 2.

20 is an energizing band that consists of a strip of resilient sheet metal; and the same is of such length that, when expanded against the inner surface of the lining 10, its ends are adjacent each other. Secured, as by rivets 21, to the inner side of the energizing band, and disposed nearer one end than the other of said band is a cross bar 22 that has a sliding fit within the groove 19 of the segment 18 so that the cross bar is capable of slight radial movement with respect to the segment. To insure adequate strength of the connection between the cross bar 22 and the energizing band 20, the latter is depressed within the enlarged countersunk outer ends of the rivet holes about the heads of the rivets 21, as shown at 23.

Especially in cases where the shock absorber is used on heavy vehicles, such as trucks, and where the energizing band accordingly is quite stiff, I may employ drag shoes 25 and 26 that engage, respectively, the end wall 4 of the casing, and the opposite end wall provided by the cover 12. These shoes consist of pads of friction material that are riveted or otherwise secured to resilient plates 27 that are fastened to the upturned ends of a member 29 shown as secured by rivets 30 to the terminal of the longer end of the energizing band.

The casing 3 and its cover 12 are desirably cast from suitable metal and shown as formed integral with the casing and extending from one side thereof is an arm 31 whose outer end is connected, through a link 32, to a part of the vehicle that is movable toward and from the part to which the case or mounting 1 is attached, which parts may consist of the frame of the vehicle and the running gear whereon said frame is spring supported.

With the parts arranged as illustrated in the drawing, the base or mounting 1 is intended for attachment to the spring suspended frame of the vehicle, and the link 32 is intended to be connected to a part of the running gear, as an axle. Therefore, when the running gear is caused to ascend quickly by one or more of the wheels overriding a bump in the road, the casing will rotate on the stud 2 in the direction indicated by the full line arrow in Fig. 1. When this occurs, the casing, and the lining 10, which moves with the casing because of its greater bearing area on the wall thereof than on the energizing band, will travel clockwise about the energizing band, inducing a tendency therein of its longer end to relax its radial pressure against the lining, while having the reverse effect upon the shorter end of the band, the latter end tending to crowd out against the lining. This action might be likened to the winding and unwinding of a spiral spring. As the lining rotates in a counter clockwise direction, it will tend to "wind up" the longer end of the band, so to speak, and cause it to withdraw from the lining, while the same action will have the effect of unwinding the shorter end of the band.

Now, when the direction of relative movement between the two vehicle parts is reversed and the spring suspended part of the vehicle tends to rise in relation to the running gear, the casing will rotate in the direction of the dotted line arrow, under which circumstances the lining 10 will rotate in a counterclockwise direction with respect to the energizing band and cause the shorter end of the band to relax its pressure against the lining, while the longer end of the band will tend to expand and increase its pressure on the lining.

It will be readily seen that the drag shoes 25 and 26 enhance both actions of the longer end of the band because, as the casing rotates in the direction of the full line arrow, the drag shoes, bearing against the end walls of the casing and therefore, tending to follow the casing in its present movement, will tend to withdraw the longer end of the band from the lining, whereas, when the casing rotates in the direction of the dotted line arrow, the drag shoes will urge the longer end of the band outwardly against the lining.

It is evident from the construction of my improved shock absorber that it may be used on either the right or left hand side of the vehicle, it being only necessary to reverse the position of the energizing band within the casing to effect the conversion.

As previously brought out, the stiffness or strength of the energizing band 20 determines the power of the shock absorber, and as further explained a band of appropriate quality in this respect is selected according to the weight of the vehicle on which it is to be used, or, in other words, according to the load to which the shock absorber is to be subjected. Now, besides resorting to a change of energizing band in order to increase the power of the shock absorber, my invention also contemplates reinforcement of a band by the application thereto of what I may term a "booster clip," and this I have illustrated in Figs. 1, 3 and 4.

At substantially diametrically opposite points on the longer end of the energizing band 20, I rivet or otherwise secure to the band abutments or buttons 33, and over these are engaged the notched ends of the booster clip 34. This clip consists of a strip of relatively stiff spring metal, and it may be quickly applied to a band while the latter is in relaxed condition outside the casing by slipping the notched ends of the clip over the buttons 33 and then contracting both the clip and the band sufficiently to insert the band into the lining 10. This provides a very quick and easy way of increasing the power of the shock absorber, and practically any desired power may be obtained by utilizing a booster clip of appropriate strength or stiffness.

Having thus described my invention, what I claim is:

1. A shock absorber comprising a stud for non-rotative attachment to a part of a vehicle, a casing journaled thereon and having an internal cylindrical wall concentric to said stud, a part within the casing fastened to said stud and having a peripheral portion in spaced relation to said wall, said peripheral portion having a recess opening toward said wall, a member engaged within said recess, an energizing band connected considerably nearer one of its ends than the other to said member, a lining of friction material between the energizing band and the cylindrical wall of the casing, and means connecting a part on the casing radially spaced from said stud to a part of the vehicle that is movable toward and from the aforesaid vehicle part.

2. A shock absorber comprising a stud for non-rotative attachment to a part of a vehicle, a casing journaled thereon and having an internal cylindrical wall concentric to said stud, a part within the casing fastened to said stud and having a peripheral portion in spaced relation to said wall, said peripheral portion having a groove that is substantially parallel to the axis of the stud, a cross bar within said groove, an energizing band of resilient metal connected considerably nearer one of its ends than the other to said cross bar, a lining of friction material between the energizing band and the cylindrical wall of the casing, and means connecting a part on said casing radially spaced from the aforesaid stud to a part of the vehicle that is movable toward and from the first mentioned vehicle part.

3. A shock absorber comprising a stud for non-rotative attachment to a part of a vehicle, a casing journaled thereon and having an internal cylindrical wall concentric to said stud and an end wall in a plane substantially normal to the axis of said stud, a part within the casing fastened to the stud and having a peripheral portion spaced from the cylindrical wall of the casing, an energizing band connected considerably closer to one of its ends than the other to said peripheral portion and extending about the cylindrical wall of the casing, a lining of friction material between the energizing band and the cylindrical wall of the casing, retarding means engaging the end wall of the casing and connected to the terminal portion of the longer end of the energizing band, and means connecting a part on the casing radially spaced from the stud to a part of the vehicle that is movable toward and from the aforesaid vehicle part.

4. A shock absorber comprising a stud for non-rotative attachment to a part of a vehicle, a casing journaled thereon and having an internal cylindrical wall concentric to said stud and end walls in planes substantially normal to the axis of the stud, a part within the casing fastened to the stud and having a peripheral portion spaced from the cylindrical wall of the casing, an energizing band connected considerably closer to one of its ends than the other to said peripheral portion and extending about the cylindrical wall of the casing, a lining of friction material between the energizing band and the cylindrical wall of the casing, retarding means engaging the end walls of the casing and connected to the terminal portion of the longer end of the energizing band, and means connecting a part on the casing radially spaced from the stud to a part of the vehicle that is movable toward and from the aforesaid vehicle part.

5. A shock absorber comprising a stud for non-rotative attachment to a part of a vehicle, a casing journaled on said stud and having an internal cylindrical wall concentric to the stud, a part within the casing fastened to said stud and having a peripheral portion in spaced relation to said cylindrical wall, an energizing band of resilient sheet metal operatively connected, within a single restricted area that is spaced a substantial distance from both ends of the band but considerably nearer one of its ends than the other, to said peripheral portion and extending about said cylindrical wall, a lining of friction material between the energizing band and said wall, said band being free to expand at every point throughout its length, the ends of the band being closely adjacent to, but entirely free from, each other so as to be capable of independent action, and means connecting a part of the casing radially spaced from said stud to a part of the vehicle that is movable toward and from the aforesaid vehicle part.

6. A shock absorber comprising a stud for non-rotative attachment to a part of a vehicle, an open front casing including a circular end wall and a cylindrical peripheral wall, said end wall having a hub journaled on said stud, a cover closing the open front of the casing and having a hub journaled on said stud in spaced relation to the first mentioned hub, a segment mounted upon and fastened to the stud between said hubs and having a peripheral portion in spaced relation to the peripheral wall of the casing, the peripheral portion of said segment having an outwardly opening groove parallel to the axis of the stud and the side walls of which are parallel to each other, a cross bar slidably fitted within said groove for slight radial movement therein, an energizing band of resilient sheet metal connected considerably nearer one of its ends than the other to said cross bar and extending about the peripheral wall of the casing, a lining of friction material between said energizing band and the last mentioned wall, the casing having a radial arm, and means connecting said arm to a part of the vehicle that is movable toward and from the aforesaid part.

7. A shock absorber comprising a stud for non-rotative attachment to a part of a vehicle, an open front casing including a circular end wall and a cylindrical peripheral wall, said end wall having a hub journaled on said stud, a cover closing the open front of the casing, a segment within the casing mounted upon and fastened to the stud, a resilient energizing band connected considerably nearer one of its ends than the other to the peripheral portion of the segment and extending about the peripheral wall of the casing, a lining of friction material between said energizing band and the last mentioned wall, means connecting a part on the casing radially spaced from the stud to a part of the vehicle that is movable toward and from the aforesaid vehicle part, and a drag shoe connected to the longer end of the energizing band frictionally engaging the end wall of the casing.

8. A shock absorber comprising a stud for non-rotative attachment to a part of a vehicle, an open front casing including a circular end wall and a cylindrical peripheral wall, said end wall having a hub journaled on said stud, a cover closing the open front of the casing and having a hub journaled on said stud in spaced relation to the first mentioned hub, a segment mounted upon and fastened to the stud between said hubs and having a peripheral portion in spaced relation to the peripheral wall of the casing, the peripheral portion of said segment having an outwardly opening groove parallel to the axis of the stud and the side walls of which are parallel to each other, a cross bar slidably fitted within said groove for slight radial movement therein, an energizing band of resilient sheet metal connected considerably nearer one of its ends than the other to said cross bar and extending about the peripheral wall of the casing, a lining of friction material between said energizing band and said wall, the casing having a radial arm, means connecting said arm to a part of the vehicle that is movable toward and from the aforesaid part, and drag shoes connected to the longer end of the energizing band, one of which yieldingly and frictionally engages the end wall of the casing and the other of which similarly engages said cover.

9. A shock absorber comprising a stud for non-rotative attachment to a part of a vehicle, a casing journaled thereon having an internal cylindrical wall concentric to said stud, a lining of friction material applied to said wall, an energizing band consisting of a strip of resilient sheet metal expanded against said lining with its ends adjacent each other, a cross bar secured to the inner side of the energizing band considerably nearer one end thereof than the other, a segment fastened to the stud and having a peripheral groove substantially parallel to the stud wherein said cross bar is guided for slight radial movement, the casing being provided with a radially extending arm, and means connecting said arm to a part of the vehicle that has yielding connection with the aforesaid part thereof.

10. A shock absorber comprising a stud for non-rotative attachment to a part of a vehicle, a casing journaled thereon having an internal cylindrical wall concentric to said stud, a lining of friction material applied to said wall, an energizing band of resilient sheet metal expanded against said lining with its ends adjacent each other, a cross bar secured to the inner side of the energizing band considerably nearer one end thereof than the other, a segment fastened to the stud and having a peripheral groove wherein said cross bar is slidably engaged for slight radial movement, retarding means attached to the terminal portion of the longer end of the energizing band and frictionally engaging a part of the casing, and means connecting a part of the casing radially spaced from the stud to a part of the vehicle that is movable toward and from the first mentioned vehicle part.

11. A shock absorber comprising two relatively movable frictionally engaged elements, one consisting of a resilient member on the stiffness of which the shock absorber depends for its power, said member having spaced abutments and a resilient reinforcing element expanded between and contacting said abutments whereby said element is detachably connected to said member for increasing the effective stiffness thereof.

12. A shock absorber comprising a drum-like element, a lining of friction material applied to the inner surface of the peripheral wall thereof, an energizing band of resilient material expanded against said lining, said band and drum-like element being relatively rotatable about a common axis, the band having abutments spaced apart circumferentially thereof and a resilient reinforcing element expanded between and in contact with said abutments whereby said element is detachably connected to the energizing band.

13. A shock absorber comprising a drum-like element, a lining of friction material applied to the inner surface of the peripheral wall thereof, an energizing band of resilient material expanded against said lining, said band and drum-like element being relatively rotatable about a common axis, abutments extending inwardly from the energizing band at points spaced apart circumferentially of the band, and a booster clip engaged with the inner side of the band and having its ends in contact with said abutments.

14. A shock absorber comprising a drum-like element, a lining of friction material applied to the inner surface of the peripheral wall thereof, an energizing band of resilient metal expanded against said lining, said band and drum-like element being relatively rotatable about a common axis, buttons projecting inwardly from substantially diametrically opposite locations on the band, and a booster clip consisting of a strip of resilient metal engaged with the inner side of the band and notched at its ends to embrace said buttons.

15. A shock absorber comprising two main members, one member having an internal cylindrical wall, said members being relatively rotatable about the axis of said cylindrical wall, a part carried by the other member and disposed inside the first member in radially spaced relation to said wall, an energizing band of resilient sheet metal operatively connected, within a single restricted area that is spaced a substantial distance from both ends of the band but considerably nearer one of its ends than the other, to said part and following the contour of said wall, and a lining of friction material between the energizing band and said wall, said band being free to expand at every point throughout its length, the ends of the band being closely adjacent to, but entirely free from, each other so as to be capable of independent action, the members being intended for use with two elements that are capable of relative movement toward and from each other, the members being attachable, respectively, to said elements in such manner that the members will be relatively rotated when the elements move as aforesaid.

BONNIE L. MALLORY.

REFERENCES CITED

The following references are of record in the file of this patent:

UNITED STATES PATENTS

| Number | Name | Date |
|---|---|---|
| 1,708,136 | Harris | Apr. 9, 1929 |
| 2,038,443 | Puls | Apr. 21, 1936 |